United States Patent
McCartney

[11] 3,990,779
[45] Nov. 9, 1976

[54] SINGLE OPTICAL FIBER CONNECTOR

[75] Inventor: Ronald L. McCartney, Orange, Calif.

[73] Assignee: International Telephone and Telegraph Corporation, New York, N.Y.

[22] Filed: July 24, 1975

[21] Appl. No.: 598,784

[52] U.S. Cl. .......................... 350/96 C; 350/96 WG
[51] Int. Cl.² ............................................ G02B 5/14
[58] Field of Search ............ 350/96 C, 96 WG, 96 B

[56] References Cited
UNITED STATES PATENTS

| | | | |
|---|---|---|---|
| 3,825,319 | 7/1974 | Cook et al. | 350/96 C |
| 3,825,320 | 7/1974 | Redfern | 350/96 C |
| 3,904,269 | 9/1975 | Lebduska et al. | 350/96 C |

*Primary Examiner*—John K. Corbin
*Assistant Examiner*—Stewart Levy
*Attorney, Agent, or Firm*—Thomas L. Peterson

[57] ABSTRACT

A connector for coupling a transmitting single optical fiber to a receiving single optical fiber in which the ends of the fibers are mounted in the respective ends of a bore in an alignment tube. The end faces of the fibers are spaced from each other and a restriction is formed in the bore between such end faces. The wall of the bore adjacent to each end of the restriction is tapered so that the optical beam emitted from the transmitting fiber is restricted in the restriction and thereafter reconstructed to its emitted numerical aperture prior to reaching the end face of the receiving fiber. The transmitting fiber is slidably mounted in the bore so as to be separable therefrom.

17 Claims, 3 Drawing Figures

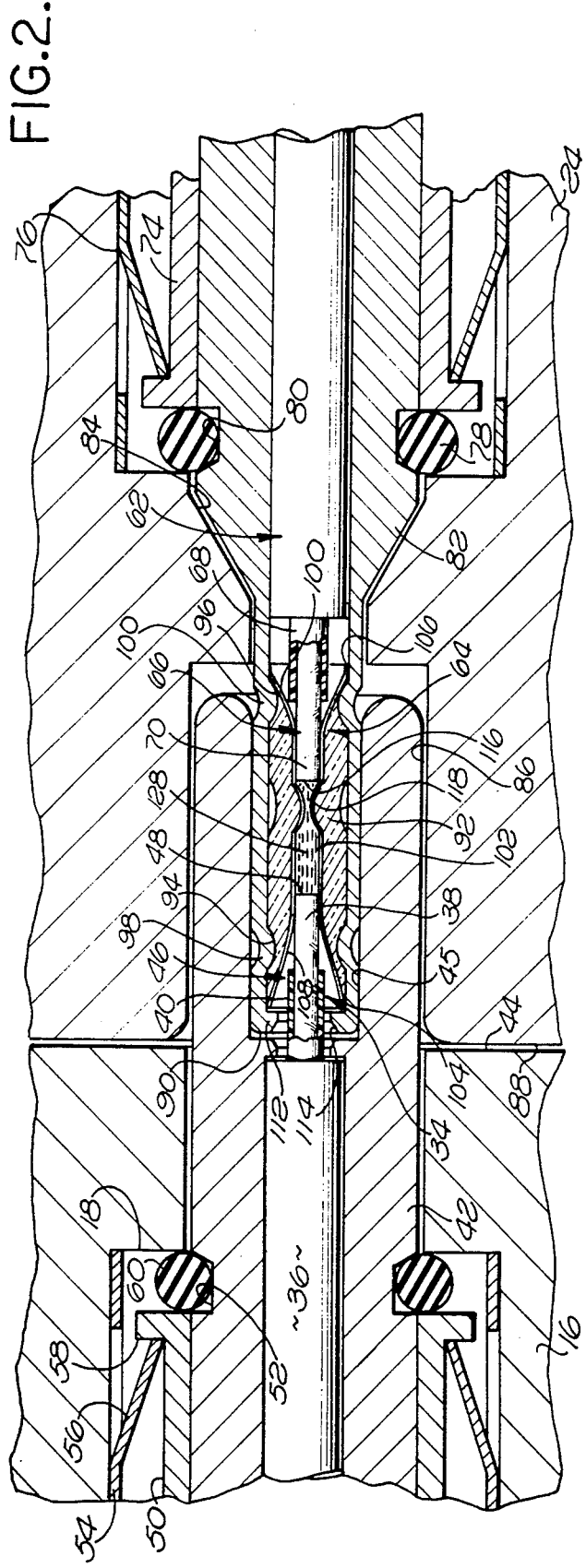

SINGLE OPTICAL FIBER CONNECTOR

BACKGROUND OF THE INVENTION

The present invention relates generally to a connector and, more specifically, to an optical coupler for single fiber optic cables.

The employment of fiber optic cables or light guides, also sometimes referred to as optical communication fibers, for the tansmission of information-bearing light signals, is now an established art. Much development work has been devoted to the provision of practical low-loss glass materials and production techniques for producing glass fiber cables with protective outer claddings or jackets. The jackets make them resemble ordinary metallic-core electrical cable upon superficial external inspection. Obviously, if fiber optic cables are to be used in practical signal transmission and processing systems, practical connectors for the connection and disconnection of fiber optic cables must be provided.

Some references will now be given for background in the state of fiber optic art in general. An article entitled, "Fiber Optics," by Narinder S. Kapany, published in *Scientific American*, Vol. 203, pgs. 72–81, November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or axial misalignment, are among the factors effecting the light transfer efficiency at a connector. In this connection, attention is directed to the *Bell System Technical Journal*, Vol. 50, No. 10, December 1971, specifically to an article by D. L. Bisbee, entitled, "Measurement of Loss Due to Offset, and End Separations of Optical Fibers." Another *Bell System Technical Journal* article of interest appeared in Vol. 52, No. 8, October 1973, and was entitled, "Effect of Misalignments on Coupling Efficiency on Single-Mode Optical Fiber But Joints," by J. S. Cook, W. L. Mammel and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to less stringent splicing requirements greater inherent redundancy and higher signal-to-noise ratio. The difficulty in achieving connections between single fibers which are insensitive to axial misalignment problems has created an obstacle to the use of long run single data transmission sytems.

Therefore, a connector or coupler is required to eliminate lateral tolerances if low-loss connections are to be obtained in the use of single fiber optical transmission arrangements. "V" groove and metal sleeve arrangements have been used to interconnect single fibers. Reference is made to U.S. Pat. No. 3,768,146 which discloses a metal sleeve interconnection for single fibers. The problem in achieving alignment between single fibers is enhanced due to the typical lack of concentricity between the fiber core and its outside cladding or jacket. Thus, even if the optical fiber cables are perfectly aligned, the cores therein may be laterally displaced. Also, in typical single fiber coupling arrangements the end faces of the transmitting and receiving fibers abut one another, which may cause scratches on the end faces and thus light transmission losses. Further, if one fiber is slidably inserted into the end of an alignment tube fixedly retaining the other fiber, as is required for a separable connector, one or both of the fibers may fracture if axially compressed during the interconnection. If the ends of the transmitting or receiving fibers were simply inserted into the ends of an alignment tube, in axially spaced relationship, some light transmission would be lost due to the fact that the receiving fiber would not completely fill the optical beam passing from the transmitting fiber through the tube. If a shoulder were formed in the bore in the tube against which the receiving fiber could be positioned, light transmission losses between the outer surface of the fiber and the wall of the bore in the tube would be eliminated. However, it is virtually impossible to maintain manufacturing tolerances such as to prevent the shoulder from extending over the peripheral region of the core of the fiber, with the result that additional light transmission losses would be suffered. Therefore, what is needed and constitutes the purpose of the present invention is to provide a coupling arrangement for a pair of single optical fibers which may be incorporated into a connector for practical field utilization, which is insensitive to fiber core alignment problems and problems in lack of concentricity between the core and the cladding of the fiber cable, and in which the receiving fiber receives the entire optical beam transmitted from the transmitting fiber.

SUMMARY OF THE INVENTION

According to the principal aspect of the present invention, there is provided a connector or coupler arrangement for coupling light from a light transmitting single optical fiber to a receiving single optical fiber. The ends of the fibers are mounted in the respective ends of a bore extending through an elongated alignment tube. The end faces of the fibers are spaced from each other in the bore. A restriction is formed in the bore between the end faces of the fibers. The wall of the bore adjacent to each end of the restriction is tapered. A reflective surface is formed on the wall of the bore between the opposed end faces of the fibers. One of the fibers, preferably the transmitting fiber, is slidably mounted in the bore so that it may be separable from the receiving fiber. By the provision of the restriction in the bore, with the tapered wall areas adjacent thereto, the optical beam emitted from the transmitting fiber is restricted and thereafter reconstructed to its emitted numerical aperture prior to reaching the end face of the receiving fiber. Such end face of the receiving fiber abuts against the tapered wall area adjacent to the restriction in the bore so that the fully reconstructed transmitted light beam impinges on the entire end face of the receiving fiber, so that light transmission losses in the coupler are minimized.

BRIEF DESCRIPTION OF THE DRAWINGS

FIG. 2 is an enlarged fragmentary sectional view showing the details of construction of the optical coupling arrangement illustrated in FIG. 1; and FIG. 3 is a greatly enlarged fragmentary sectional view of the light transmitting area in the alignment tube of the coupler illustrated in FIGS. 1 and 2.

DESCRIPTION OF THE PREFERRED EMBODIMENT

Figure 1:
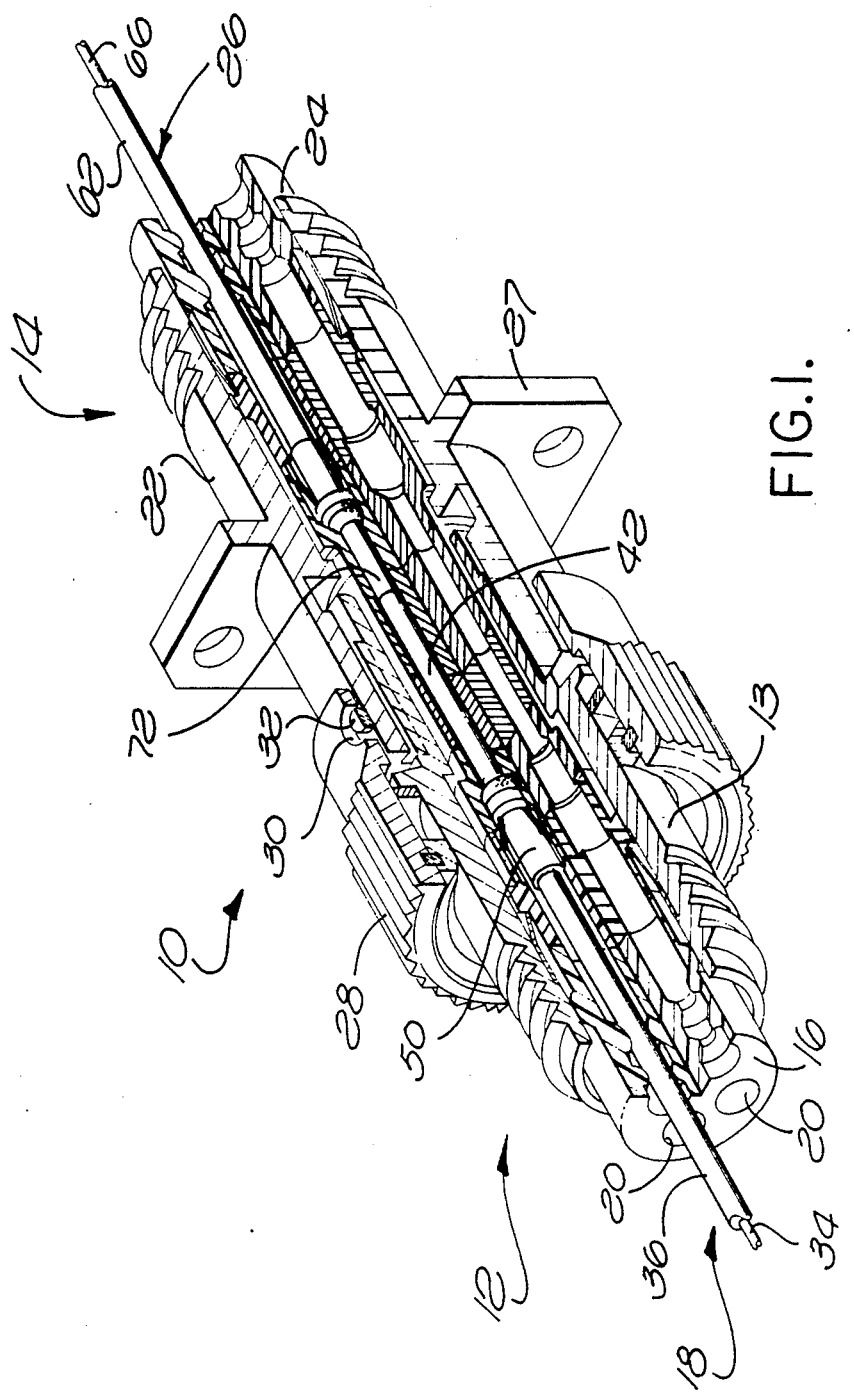
FIG. 1 is a longitudinal sectional view through the connector of the present invention employing my novel optical coupling arrangement.

The present invention is generally applicable to the interconnection of a pair of single optical fiber cables. A conventional single optical fiber cable comprises an optical fiber and an outer protective jacket typically formed of plastic. The fiber consists of an inner core and an outer layer called a cladding. A variety of such optical fibers are now available. The fibers may have a plastic core, with a plastic cladding, a glass core with a plastic cladding, or a glass core with a glass cladding. More recently, a chemical vapor deposition (CVD) fiber has become available consisting of a quartz fiber having a germanium core. In the present invention, it is preferred than an optical fiber be utilized in which the cladding thereon may be readily removed. However, other forms of fibers in which the cladding cannot be removed may be utilized, but with greater light transmission losses.

Referring now to the drawings in detail, there is illustrated in FIG. 1 a fiber optic connector in accordance with the present invention, generally designated 10, comprising a plug connector member 12 mated to a receptacle connected member 14. The plug connector member 12 comprises a shell 13 containing a support member 16 which supports a plurality of transmitting single fiber optic cables 18, only one being illustrated for purposes of clarity. It is noted that the support member 16 contains four axially extending passages 20 therethrough for holding the fiber optic cables. It will be appreciated that any number of cables may be mounted in the connector member 12.

The mating receptacle connector member 14 also includes a shell 22 containing a support member 24 for receiving single fiber optic cables 26 equal in number to the cables 18 in plug connector member 12 and axially aligned therewith. The shell 22 has a mounting flange 27 thereon for mounting the connector 10 to a suitable panel or the like. The plug connector member 12 carries a rotatable coupling nut 28 having an accurate slot therein which cooperates with a pin 32 on the shell 22 to provide a bayonet connection between the two connector members, as well known in the electrical field, which allows the two connector members to be axially mated upon rotation of the coupling nut 28.

The support members 16 and 24 in the connector shells may be single pieces or multiple piece arrangements, as illustrated in FIG. 1.

The transmitting fiber optic cable 18 comprises an optical fiber 34 and an outer plastic jacket 36. The fiber 34 consists of an inner core 38, which may be formed of plastic or glass, and an outer plastic cladding 40. A termination pin 42 terminates the end of cable 18. The forward end of the pin extends beyond the front face 44 of the support member 16. A cylindrical recess 45 is formed in the forward end of the pin. The end of the plastic jacket 36 of the cable is cut and removed leaving a bare end portion 46 which extends into the recess 45 of the termination pin. An end portion of the plastic cladding 40 is also removed thereby leaving an unclad end of the fiber core 38 concentrically positioned within the cylindrical recess 45. It is noted that the front face 48 of the core 38 is positioned behind the forward end of termination pin so as to be entirely surrounded by the pin and thereby protected against damage.

A collar 50 is slidable on the pin 42 behind annular groove 52 in the pin. A spring retention element 54 has a pair of forwardly and inwardly extending spring fingers 56 engaging rearwardly facing shoulder 58 on the collar 50 limiting rearward movement of the termination pin in the support member 16. A resilient annular ring 60 lies within the groove 52 for axial tolerance relief of the pin.

The receiving optical fiber cable 26 may be identical to the cable 18. The end of the plastic jacket 62 is removed leaving a bare end portion 64 of the fiber 66 of the cable exposed. The end portion of the plastic cladding 68 of the fiber 66 is removed leaving an unclad end of the core 70 of the cable. A termination pin 72 terminates the end of the cable 26. The pin has a generally cylindrical configuration and is dimensioned to slidably fit within the cylindrical recess 45 in the termination pin 42 on the end of the cable 18. A slidable collar 74 and spring retention element 76 identical to the collar 50 and retention element 54 are provided for the termination pin 72. Further, a resilient annular ring 78 lies within an annular groove 80 in the pin to provide for axial tolerance relief of the pin. The pin 72 is also formed with a forwardly facing tapered shoulder 82 which engages a rearwardly facing surface 84 on the support member 24 to limit forward movement of the termination pin into the receptacle connector member 14.

The termination pin 72 extends into a cylindrical cavity 86 which opens at the front face 88 of the support member 24. The cavity 86 is axially aligned with the termination pin 42 in the plug connector member 18 and is dimensioned to slidably receive the forward end of the pin therein when the two connector members are mated together. The forward end 90 of the termination pin 72 terminates just short of the front face 88 of support member 24. The pin 72 is concentric with respect to the cylindrical cavity 86. Thus, when the connector members 12 and 14 are interconnected, the forward end of the termination pin 42 extends into the cavity 86 and the forward end of the termination pin 72 extends into the recess 45 in the pin 42.

An elongated generally cylindrical alignment tube 92 is mounted in the forward end of the termination pin 72. The tube may be formed with a pair of axially spaced annular grooves 94 and 96. The regions indicated at 98 and 100 of the termination pin may be deformed into the grooves 94 and 96, respectively, to axially retain the alignment tube in the pin. A generally cylindrical bore 102 extends longitudinally through the alignment tube in axial alignment with the fiber cores 38 and 70 of the cables 18 and 26, respectively. The outer ends of the bore adjacent to the opposite ends 104 and 106 of the alignment tube are tapered outwardly as indicated at 108 and 110 defining lead-in entrances for guiding the fiber cores 38 and 70 into the opposite ends of the bore 102. Preferably an inwardly extending flange 112 is formed on the forward end 90 of termination pin 72 extending over the end to 104 of the alignment tube. The flange 112 is beveled as indicated at 114 to further assist in guiding the core 38 into the alignment tube.

When the connector members 12 and 14 are fully interconnected, as illustrated in FIG. 2, the end face 48 of the fiber core 38 is axially spaced from the end face 116 of the fiber core 70 within the bore 102 of the alignment tube. As best seen in FIG. 3, a restriction 118 is formed in the bore 102 between the ends faces 48 and 116 of the transmitting and receiving optical fibers. The wall of the bore is tapered at opposite ends of the restriction, as indicated at 120 and 122. When the termination pin 72 is being assembled to the receiving fiber cable 26 during manufacture, the core 70 of the cable is inserted onto the bore 102 of the alignment tube until the outer periphery of the end face 116 of the core abuts against the taper 122 in the bore, thereby providing an annular light seal in the region 124 between the wall of the bore and the fiber so that the optical beam passing from the transmitting fiber core 38 through the core 102 will be completely received by the receiving optical fiber core 70. No light rays can pass between the outer surface of the fiber core 70 and the wall of the bore 102 surrounding the fiber. Preferably, the length of the fiber core 30 of the transmitting optical fiber cable 18 is chosen so that when the connector members are mated the end face 48 of the core 38 is spaced from the tapered wall portion 120 of the bore 102. The length of the bore between the taper 120 and the end 104 of the alignment tube is sufficient to overcome axial tolerances in the length of the fiber. Preferably, the maximum length of the fiber core is sufficiently short to assure that the fiber does not engage the tapered wall 120 of the bore which would otherwise result in the fiber being axially compressed during the interconnection of the connector members with possible fracture of the fiber occurring. However, the invention is not limited to the foregoing arrangement wherein end face 48 of the fiber is spaced from tapered wall 120. It is possible that fracture of the fiber would not occur when the end face, indicated in dotted lines at 48′, lightly engages tapered wall 120 since axial compression forces may be accommodated by flexing of the core 38 within its loose cladding 40, and by the flexing of the entire fiber 24 within the outer jacket 36.

The wall of the bore 102 is coated with a reflective layer 126 which must extend at least between the end faces 48 and 116 of the transmitting and receiving fibers. The reflective layer should extend at least to the tapered end 108 of the bore to accommodate axial tolerances in the length of the fiber core 38. For ease of manufacture, it if preferred that the entire inner surface of the bore 102 between the ends of the alignment tube be provided with the reflective layer. The reflective layer may be any suitable metal plating on the wall of the bore, for example, gold, silver or aluminum. Gold is the preferred coating material because of its high reflective properties. It is noted that the metallic layer 126 is deformed at the region 124 of the bore 102 thereby enhancing the light seal between the core 70 and wall of the alignment tube. An index matching fluid 128 may be provided in the bore 102 between the end faces of the fibers 34 and 66, if desired.

The alignment tube 92 may be formed of any suitable material. For example, the tube may be formed of glass, as illustrated in FIGS. 2 and 3. The glass tubing may be a thick walled capillary tube, such as a conventional thermometer tube. The tube is first cut to its desired length and then the ends of the bore in the tube are ground to provide the tapered entrances 108 and 110. The grooves 94 and 96 in the outer surface of the tube may be formed by heating the wall of the tube and deforming the same by use of a suitable tool. The restriction 118 in the bore 102 in the tube may be formed by heating the intermediate region of the glass tube and either pulling the tube axially to reduce its cross section, or compressing the heated region of the tube by the use of a suitable tool. Obviously other materials and techniques may be utilized for forming the alignment tube.

It will be appreciated that when the connector members 12 and 14 are interconnected, coupling the transmitting and receiving optical fibers in the alignment tube 92, the optical beam emitted from the transmitting fiber is restricted to a concentric smaller diameter beam in the restriction 118 in the bore 102 in the tube. The beam is reconstructed to its emitted numerical aperture in the tapered region 122 of the bore 102. The receiving fiber 70 totally and concentrically fills the beam diameter, thereby collecting all the optical beam transmitted from the fiber 38. It will be appreciated that the slope of the tapered walls 120 and 122 of the light transmitting bore 102 should be no greater than the angle of emission $\theta$ (see FIG. 3) of light emitted from the transmitting fiber. If the slope of the tapered wall areas of the bore were greater than $\theta$, the angle of propogation of some of the light rays emitted from the transmitting fiber would be too high for transmission through the receiving fiber.

By the way of example only, when using 6 mil diameter transmitting and receiving optical fibers, the diameter of the cylindrical portions of the bore 102 may be 7 mils, the diameter of the restriction 118 may be 5 mils and the slope of the tapered areas 120 and 122 of the wall of the bore 102 may be between about 3° and 5° for maximum light transmission characteristics.

It will be appreciated from the foregoing that the propogating optical beam emitted from the transmitted optical fiber 38 will maintain a diameter which is equal to or less than the diameter of the receiving fiber core 70. The received beam will have a numerical aperture which is equal or less than the transmitted numerical aperture. The received optical beam is generally concentric to the receiving fiber although it is not required that there be absolute concentricity between the transmitting and receiving fibers due to the restricted configuration of the light transmitting bore between the end faces of the fibers. Further, the transmitting fiber core 38 preferably has axial clearance within the bore 102 so as to avoid compressive fracture of the fiber when the connector members 12 and 14 are interconnected. As explained previously herein, it is preferred that the optical fibers employed in the connector of the present invention have cladding thereon which is removable. However, permanently clad fibers could be utilized, but with a resultant small loss in light transmission due to a small percentage of the optical beam emitted from the transmitting fiber impinging upon the end surface of the cladding of the receiving fiber.

What is claimed is:

1. A fiber optic connector for coupling a transmitting single optical fiber to a receiving single optical fiber comprising:
   an elongated alignment tube having a bore therethrough extending to the ends of said tube;
   a restriction in said bore between the ends of said tube;
   the wall of said bore adjacent to each end of said restriction being tapered outwardly;
   a transmitting single optical fiber having an end slidably mounted in one end of said bore and having an end face adjacent to said restriction;

a receiving single optical fiber having an end mounted in the other end of said bore and having an end face closely adjacent to the tapered wall leading to the end of said restriction closest to said other end of said bore, said restriction axially spacing said end faces of said fibers apart in said tube; and a reflective surface on the wall of said bore between the opposed end faces of said fibers.

2. A fiber optic connector as set forth in claim 1 wherein:
said restriction with the tapered wall areas leading thereto has a generally symmetrical configuration.

3. A fiber optic connector as set forth in claim 1 wherein:
the periphery of said end face of said receiving fiber abuts said tapered wall area of said bore closest to said other end of said bore to provide a light seal therebetween.

4. A fiber optic connector as set forth in claim 1 wherein:
said end face of said transmitting fiber is spaced from the tapered wall area of said bore closest to said one end of said bore.

5. A fiber optic connector as set forth in claim 2 wherein:
the periphery of said end face of said receiving fiber abuts said tapered wall area of said bore closest to said other end of said bore to provide a light seal therebetween; and
said end face of said transmitting fiber is spaced from the tapered wall area of said bore closest to said one end of said bore.

6. A fiber optic connector as set forth in claim 1 wherein:
said reflective surface on the wall of said bore extends behind said end face of said transmitting fiber.

7. A fiber optic connector as set forth in claim 1 wherein:
the ends of said bore adjacent to said ends of said tube taper outwardly providing lead-in entrances for said fibers into the ends of said bore.

8. A fiber optic connector as set forth in claim 7 wherein:
said reflective surface on the wall of said bore extends at least between the inner end of said lead-in entrance adjacent to said one end of said bore to the larger end of the tapered wall area closest to said other end of said bore.

9. A fiber optic connector as set forth in claim 1 wherein:
said ends of said fibers are unclad.

10. A fiber optic connector as set forth in claim 1 wherein:
the slope of said tapered wall areas of said bore is no greater than the angle of emission of light emitted from said transmitting fiber.

11. A fiber optic connector as set forth in claim 1 including:
first and second mating connector members;
said transmitting fiber being mounted in said first connector member;
said alignment tube and receiving fiber being mounted in said second connector member; and
said end of said transmitting fiber slides into said one end of said bore in said alignment tube when said connector members are mated.

12. A fiber optic connector as set forth in claim 11 including: a termination pin in said second connector member surrounding said alignment tube and fixed thereto.

13. A fiber optic connector as set forth in claim 12 wherein:
the forward end of said termination pin extends into a forwardly opening recess in said second connector member, the wall of said recess being spaced from said pin to define an annular space therebetween; and
a second termination pin in said first connector member surrounds and is spaced from said transmitting fiber, said second termination pin being slidably received in said annular space when said connector members are mated, and slidably receiving therein said first-mentioned termination pin.

14. A fiber optic connector for coupling a transmitting single optical fiber to a receiving single optical fiber comprising:
an alignment device having a bore therethrough;
a transmitting single optical fiber having an end extending into one end of said bore;
a receiving single optical fiber having an end extending into the other end of said bore;
said fibers having opposed end faces in said bore axially spaced from each other; and
restriction means in said bore between said end faces, said restriction means restricting the optical beam emitted from said transmitting fiber and reconstructing said beam to its emitted numerical aperture prior to reaching said end face of said receiving fiber.

15. A fiber optic connector as set forth in claim 14 wherein:
one of said fibers is slidably mounted in said bore and, therefore, is removable therefrom.

16. A fiber optic connector as set forth in claim 1 wherein:
said fibers abut said tapered wall areas of said bore, respectively.

17. A fiber optic connector as set forth in claim 1 including:
an index matching fluid in said bore between said end faces.

* * * * *